(12) United States Patent
Cheng et al.

(10) Patent No.: US 8,121,967 B2
(45) Date of Patent: Feb. 21, 2012

(54) STRUCTURAL DATA CLASSIFICATION

(75) Inventors: Hong Cheng, Urbana, IL (US); Wei Fan, New York, NY (US); Xifeng Yan, Montrose, NY (US); Philip Shi-lung Yu, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 12/141,251

(22) Filed: Jun. 18, 2008

(65) Prior Publication Data

US 2009/0319457 A1    Dec. 24, 2009

(51) Int. Cl.
*G06F 17/00*    (2006.01)
*G06N 5/02*    (2006.01)

(52) U.S. Cl. ......................................................... 706/46

(58) Field of Classification Search .................... None
See application file for complete search history.

(56) References Cited

U.S. PATENT DOCUMENTS

| | | | | |
|---|---|---|---|---|
| 5,835,633 | A * | 11/1998 | Fujisaki et al. | 382/187 |
| 6,459,974 | B1 * | 10/2002 | Baloch et al. | 701/45 |
| 2003/0009333 | A1 * | 1/2003 | Sharma et al. | 704/246 |
| 2004/0236576 | A1 * | 11/2004 | Thiesson et al. | 704/255 |
| 2008/0097939 | A1 * | 4/2008 | Guyon et al. | 706/12 |

OTHER PUBLICATIONS

'Frequent substructure based approaches for classifying chemical compounds': Deshpande, 2005, IEEE, 1041-4347, pp. 1036-1050.*
'Ensemble methods in machine learning': Dietterich, 2000, Springer-Verlag, LNCS 1857, pp. 1-15.*
'A general cost model for dimensionality reduction in high dimensional spaces': Lian, 2007, IEEE, 1-4244-0803, pp. 66-75.*
'Learning from imbalanced data': He, 2009, IEEE, 1041-4347, pp. 1263-1284.*
A. Inokuchi et al., "An Apriori-based Algorithm for Mining Frequent Substructures from Graph Data," In Proc. 2000 European Symposium on the Principle of Data Mining and Knowledge Discovery (PKDD'00), 2000, pp. 13-23.
M. Deshpande et al., "Frequent Substructure-Based Approaches for Classifying Chemical Compounds," IEEE Trans. on Knowledge and Data Engineering, 2005, pp. 1036-1050, vol. 17, No. 8.
N. Wale et al., "Comparison of Descriptor Spaces for Chemical Compound Retrieval and Classification," In Proc. 6th International Conference on Data Mining (ICDM'06), 2006, pp. 1-29.

* cited by examiner

*Primary Examiner* — Omar Fernandez Rivas
*Assistant Examiner* — Peter Coughlan
(74) *Attorney, Agent, or Firm* — William Stock; Ryan, Mason & Lewis, LLP

(57) ABSTRACT

Techniques for classifying structural data with skewed distribution are disclosed. By way of example, a method classifying structural input data comprises a computer system performing the following steps. Multiple classifiers are constructed, wherein each classifier is constructed on a subset of training data, using one or more selected composite features from the subset of training data. A consensus among the multiple classifiers is computed in accordance with a voting scheme such that at least a portion of the structural input data is assigned to a particular class in accordance with the computed consensus. Such techniques for structured data classification are capable of handling skewed class distribution and partial feature coverage issues.

17 Claims, 6 Drawing Sheets

| DATASETS | $N$ | $N_+$ | $N_-$ | $\%(N_+/N)$ |
|---|---|---|---|---|
| NCI1 | 40353 | 2057 | 38296 | 5.09 |
| NCI109 | 40516 | 2079 | 38437 | 5.13 |
| NCI123 | 39765 | 3140 | 36625 | 7.89 |
| NCI145 | 40004 | 1955 | 38049 | 4.89 |
| NCI167 | 79601 | 9568 | 70033 | 12.02 |
| NCI33 | 39988 | 1643 | 38345 | 4.11 |
| NCI330 | 41472 | 2298 | 39174 | 5.54 |
| NCI41 | 27509 | 1568 | 25941 | 5.69 |
| NCI47 | 40271 | 2025 | 38246 | 5.03 |
| NCI81 | 40532 | 2410 | 38122 | 5.94 |
| NCI83 | 27770 | 2294 | 25476 | 8.26 |
| H1 | 42348 | 1493 | 40855 | 3.53 |
| H2 | 41274 | 419 | 40855 | 1.02 |

FIG. 3

(A) MSE BY C4.5

| DATASETS | SE | NS | SS |
|---|---|---|---|
| NCI1 | 0.193 ± 0.023 | 0.741 ± 0.036 | 0.559 ± 0.034 |
| NCI109 | 0.203 ± 0.031 | 0.760 ± 0.047 | 0.561 ± 0.033 |
| NCI123 | 0.226 ± 0.030 | 0.708 ± 0.026 | 0.607 ± 0.029 |
| NCI145 | 0.197 ± 0.027 | 0.756 ± 0.025 | 0.548 ± 0.044 |
| NCI167 | 0.294 ± 0.022 | 0.761 ± 0.035 | 0.685 ± 0.030 |
| NCI33 | 0.212 ± 0.021 | 0.786 ± 0.058 | 0.572 ± 0.056 |
| NCI330 | 0.212 ± 0.028 | 0.751 ± 0.063 | 0.565 ± 0.053 |
| NCI41 | 0.213 ± 0.025 | 0.753 ± 0.050 | 0.585 ± 0.028 |
| NCI47 | 0.204 ± 0.025 | 0.762 ± 0.033 | 0.568 ± 0.036 |
| NCI81 | 0.212 ± 0.025 | 0.743 ± 0.016 | 0.586 ± 0.035 |
| NCI83 | 0.228 ± 0.031 | 0.708 ± 0.040 | 0.591 ± 0.034 |
| H1 | 0.250 ± 0.068 | 0.817 ± 0.060 | 0.596 ± 0.070 |
| H2 | 0.202 ± 0.062 | 0.832 ± 0.084 | 0.495 ± 0.086 |

(B) MSE BY SVM

| DATASETS | SE | NS | SS |
|---|---|---|---|
| NCI1 | 0.189 ± 0.024 | 0.886 ± 0.008 | 0.540 ± 0.022 |
| NCI109 | 0.191 ± 0.031 | 0.895 ± 0.003 | 0.540 ± 0.018 |
| NCI123 | 0.205 ± 0.025 | 0.847 ± 0.003 | 0.676 ± 0.024 |
| NCI145 | 0.192 ± 0.024 | 0.895 ± 0.011 | 0.524 ± 0.034 |
| NCI167 | 0.220 ± 0.023 | 0.750 ± 0.018 | 0.673 ± 0.018 |
| NCI33 | 0.194 ± 0.023 | 0.913 ± 0.006 | 0.544 ± 0.037 |
| NCI330 | 0.193 ± 0.041 | 0.891 ± 0.005 | 0.557 ± 0.062 |
| NCI41 | 0.195 ± 0.028 | 0.883 ± 0.002 | 0.572 ± 0.037 |
| NCI47 | 0.193 ± 0.027 | 0.902 ± 0.006 | 0.529 ± 0.019 |
| NCI81 | 0.194 ± 0.025 | 0.876 ± 0.007 | 0.553 ± 0.025 |
| NCI83 | 0.202 ± 0.023 | 0.837 ± 0.006 | 0.623 ± 0.060 |
| H1 | 0.202 ± 0.045 | 0.914 ± 0.017 | 0.639 ± 0.019 |
| H2 | 0.158 ± 0.075 | 0.975 ± 0.005 | 0.408 ± 0.054 |

(C) AUC BY C4.5

| DATASETS | SE | NS | SS |
|---|---|---|---|
| NCI1 | 0.833 ± 0.022 | 0.589 ± 0.031 | 0.650 ± 0.025 |
| NCI109 | 0.823 ± 0.022 | 0.555 ± 0.062 | 0.640 ± 0.026 |
| NCI123 | 0.771 ± 0.025 | 0.606 ± 0.021 | 0.608 ± 0.015 |
| NCI145 | 0.830 ± 0.025 | 0.595 ± 0.034 | 0.654 ± 0.014 |
| NCI167 | 0.681 ± 0.036 | 0.557 ± 0.018 | 0.569 ± 0.011 |
| NCI33 | 0.808 ± 0.019 | 0.536 ± 0.085 | 0.648 ± 0.027 |
| NCI330 | 0.830 ± 0.024 | 0.600 ± 0.042 | 0.609 ± 0.059 |
| NCI41 | 0.800 ± 0.012 | 0.603 ± 0.026 | 0.606 ± 0.027 |
| NCI47 | 0.821 ± 0.023 | 0.630 ± 0.013 | 0.640 ± 0.005 |
| NCI81 | 0.810 ± 0.028 | 0.589 ± 0.022 | 0.652 ± 0.021 |
| NCI83 | 0.773 ± 0.018 | 0.594 ± 0.026 | 0.608 ± 0.024 |
| H1 | 0.726 ± 0.038 | 0.399 ± 0.077 | 0.556 ± 0.032 |
| H2 | 0.857 ± 0.043 | 0.427 ± 0.075 | 0.682 ± 0.065 |

(D) AUC BY SVM

| DATASETS | SE | NS | SS |
|---|---|---|---|
| NCI1 | 0.854 ± 0.031 | 0.583 ± 0.026 | 0.736 ± 0.035 |
| NCI109 | 0.838 ± 0.031 | 0.508 ± 0.005 | 0.727 ± 0.037 |
| NCI123 | 0.774 ± 0.035 | 0.517 ± 0.024 | 0.619 ± 0.070 |
| NCI145 | 0.849 ± 0.035 | 0.550 ± 0.049 | 0.755 ± 0.025 |
| NCI167 | 0.716 ± 0.029 | 0.609 ± 0.019 | 0.623 ± 0.027 |
| NCI33 | 0.843 ± 0.017 | 0.512 ± 0.035 | 0.737 ± 0.029 |
| NCI330 | 0.846 ± 0.045 | 0.606 ± 0.075 | 0.759 ± 0.029 |
| NCI41 | 0.813 ± 0.016 | 0.679 ± 0.016 | 0.720 ± 0.032 |
| NCI47 | 0.844 ± 0.034 | 0.501 ± 0.004 | 0.750 ± 0.033 |
| NCI81 | 0.835 ± 0.030 | 0.541 ± 0.072 | 0.739 ± 0.021 |
| NCI83 | 0.802 ± 0.005 | 0.633 ± 0.027 | 0.692 ± 0.017 |
| H1 | 0.753 ± 0.041 | 0.632 ± 0.034 | 0.661 ± 0.043 |
| H2 | 0.912 ± 0.030 | 0.519 ± 0.021 | 0.845 ± 0.049 |

FIG. 4

| DATASET | AUC | | MSE | |
|---|---|---|---|---|
| | SE | SE+FE | SE | SE+FE |
| NCI1 | 0.8326 | 0.8566 | 0.1931 | 0.1806 |
| NCI109 | 0.8229 | 0.8422 | 0.2027 | 0.1919 |
| NCI123 | 0.7705 | 0.7946 | 0.2264 | 0.2127 |
| NCI145 | 0.8303 | 0.8501 | 0.1965 | 0.1877 |
| NCI167 | 0.6805 | 0.7036 | 0.2937 | 0.2767 |
| NCI33 | 0.8076 | 0.8344 | 0.2124 | 0.1972 |
| NCI330 | 0.8300 | 0.8515 | 0.2141 | 0.1986 |
| NCI41 | 0.7995 | 0.8163 | 0.2133 | 0.2062 |
| NCI47 | 0.8209 | 0.8460 | 0.2035 | 0.1883 |
| NCI81 | 0.8104 | 0.8394 | 0.2124 | 0.1952 |
| NCI83 | 0.7730 | 0.8020 | 0.2280 | 0.2088 |
| H1 | 0.7259 | 0.7360 | 0.2496 | 0.2409 |
| H2 | 0.8569 | 0.8920 | 0.2023 | 0.1789 |

FIG. 5

STRUCTURAL DATA CLASSIFICATION

FIELD OF THE INVENTION

The present invention relates to structural data classification in database systems and, more particularly, to classifying structural data with skewed prior class distribution in such database systems.

BACKGROUND OF THE INVENTION

Advanced database system research faces a great challenge necessitated by the emergence of massive, complex structural data (e.g., sequences, lattices, trees, graphs and networks) which are encountered in applications such as bio-informatics, geo-informatics and chem-informatics. A particular challenge involves graph classification, i.e., correctly assigning molecules or chemical compounds to various classes, e.g., toxic versus nontoxic, or active versus inactive.

Graphs are the most general form of structural data, and thus are used extensively in chem-informatics and bio-informatics datasets. In chem-informatics, an important task is to infer chemical or biological properties of a molecule from its structure. Similarly, in drug design process, one of the key steps is the identification of chemical compounds that display the desired and reproducible behavior against a specific biomolecular target. In computer vision and pattern recognition, where graphs are used to represent complex structures, such as hand-drawn symbols, three-dimensional objects and medical images, it is also desirable to perform graph classification, such as letter or digit classification, as well as face recognition.

A number of methods have been developed to perform classification on complex structural data. See, for example, A. Inokuchi et al., *An Apriori-based Algorithm for Mining Frequent Substructures from Graph Data*, In Proc. 2000 European Symposium On The Principle Of Data Mining And Knowledge Discovery (PKDD'00), pgs. 13-23 (2000); M. Deshpande et al., *Frequent Substructure-based Approaches for Classifying Chemical Compounds*, 17(8) IEEE Trans. On Knowledge And Data Engineering, pgs. 1036-1050 (2005); N. Wale et al., *Comparison of Descriptor Spaces for Chemical Compound Retrieval and Classification*, In Proc. 6th International Conference On Data Mining (ICDM'06), pgs. 678-689 (2006), the disclosures of which are incorporated by reference herein.

While these methods are very useful, they do have important limitations. Specifically, none of the cited methods accommodate the skewed class distribution of the real graph datasets, which is quite common in real applications. If traditional learning methods are directly applied on skewed data, they tend to be biased towards the majority class and ignore the minority class, since the goal of such methods is to minimize the error rate. However, the primary purpose of the graph classification is to identify the rare active class from the vast inactive class. The cost of misclassifying minority examples is usually very huge. Therefore, an effective solution to handle the skewed distribution problem would be desirable.

SUMMARY OF THE INVENTION

Principles of the invention provide techniques for classifying structural data with skewed distribution.

By way of example, in a first embodiment, a method classifying structural input data comprises a computer system performing the following steps. Multiple classifiers are constructed, wherein each classifier is constructed on a subset of training data, using one or more selected composite features from the subset of training data. A consensus among the multiple classifiers is computed in accordance with a voting scheme such that at least a portion of the structural input data is assigned to a particular class in accordance with the computed consensus.

The subset of training data may be selected from a full training dataset, among which positive and negative data are balanced. The set of composite features may not be the same across different classifiers. The set of composite features may be selected so as to differentiate training data. The composite features may also be selected such that feature discrimination and class labels are considered. The composite features may be substructures directly mined from structural datasets. The structural data may comprise skewed structural data. The skewed structural data may comprise skewed graph data.

Advantageously, such techniques for structured data classification are capable of handling skewed class distribution and partial feature coverage issues.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 illustrates first results in accordance with an empirical study performed in accordance with the present invention.

FIG. 4 illustrates second results in accordance with an empirical study performed in accordance with the present invention.

FIG. 5 illustrates third results in accordance with an empirical study performed in accordance with the present invention.

DETAILED DESCRIPTION

While illustrative embodiments of the invention may, on occasion, be described below in the context of chem-informatics and bio-informatics type datasets, it is to be understood that principles of the invention are not so limited. That is, principles of the invention are applicable to any suitable datasets that represent structural data.

Figure 1:
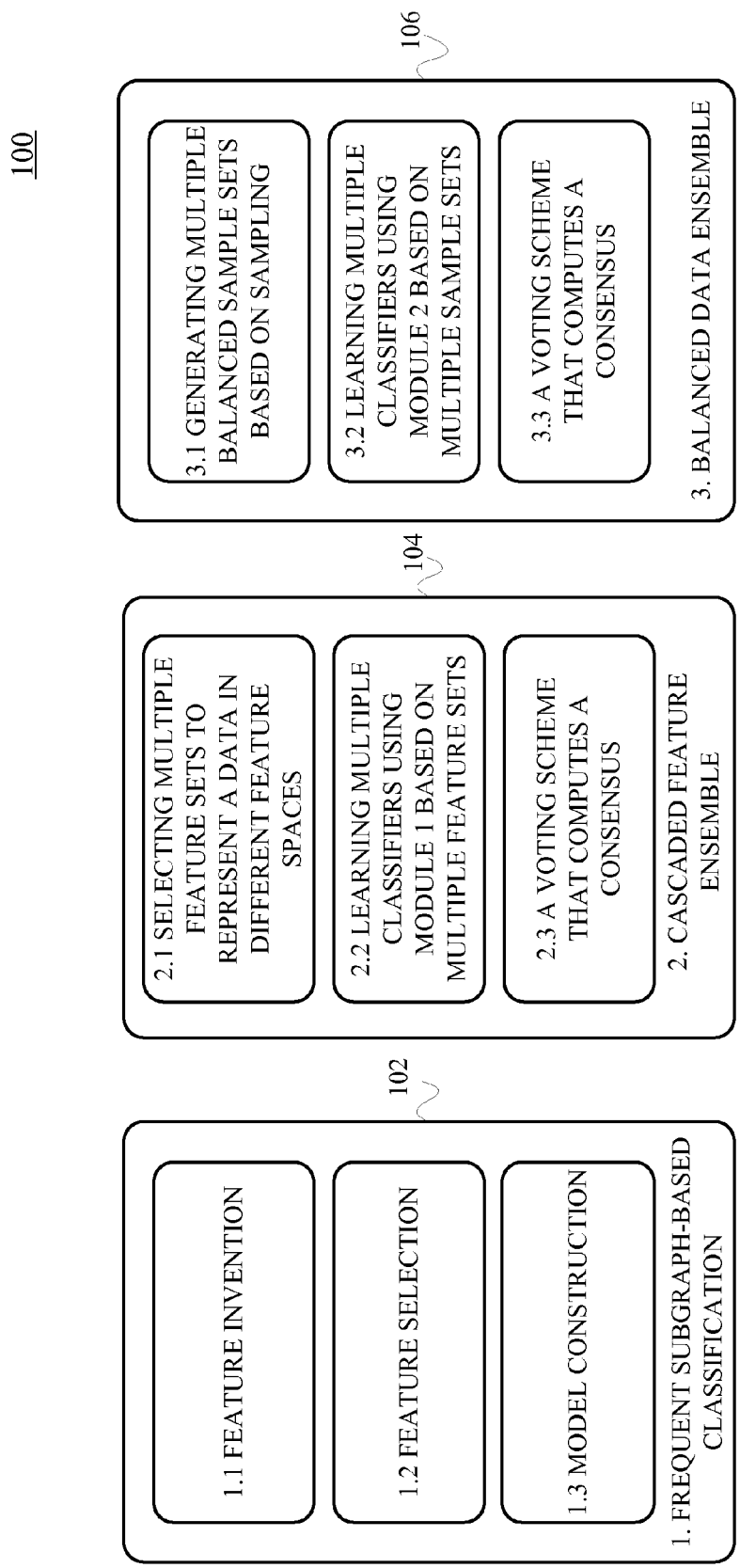
FIG. 1 illustrates an exemplary system for classifying graphs, according to an embodiment of the present invention.

FIG. 1 is a diagram illustrating the functional modules of classification system 100, according to an embodiment of the invention. The system includes the following three modules:

Frequent Subgraph-based Classification Module 102: Given a set of graph data, the first step is feature invention (1.1), where frequent subgraph mining is applied to construct discriminative features from graph datasets. Then feature selection (1.2) is applied to single out a compact set of features, from a large set of frequent subgraphs. Based on the feature set, the graph data is transformed into a feature vector representation, on top of which a classification model is constructed (1.3).

Cascaded Feature Ensemble Module 104: To handle the partial feature coverage problem, feature selection (2.1) is iteratively applied to find multiple disjoint feature sets to represent the data in different features spaces. Multiple classifiers are constructed (2.2) using Module 102, based on different feature sets and then a voting scheme is defined (2.3) that computes the consensus among the learned classifiers. That is, for a given structured input data, each classifier will predict a class. Since there are multiple classifiers, the assigned class for this data is the class predicted by the majority of classifiers.

Balanced Data Ensemble Module 106: Given a set of graph data with skewed prior class distribution, a sampling technique (without replacement) is used (3.1) to draw repeated samples of the positive class and under-samples of the negative class to achieve a balanced class distribution. Then, a balanced data ensemble is constructed by first learning multiple classifiers, where each classifier is built (3.2) on a subset of balanced training data using Module 104, and then using a voting scheme that computes (3.3) the consensus among the learned multiple classifiers.

Specifically, this methodology may be employed to classify graphs in a database. The term "graph," as used herein, is intended to include, but not be limited to, any form of structural data comprising one or more features, such as, graph data sets, images, sequences and combinations comprising at least one of the foregoing data forms. The term "features," as used herein, is intended to include, but not be limited to, node, edge, node/edge attribute, path, tree, and graph.

Figure 2:
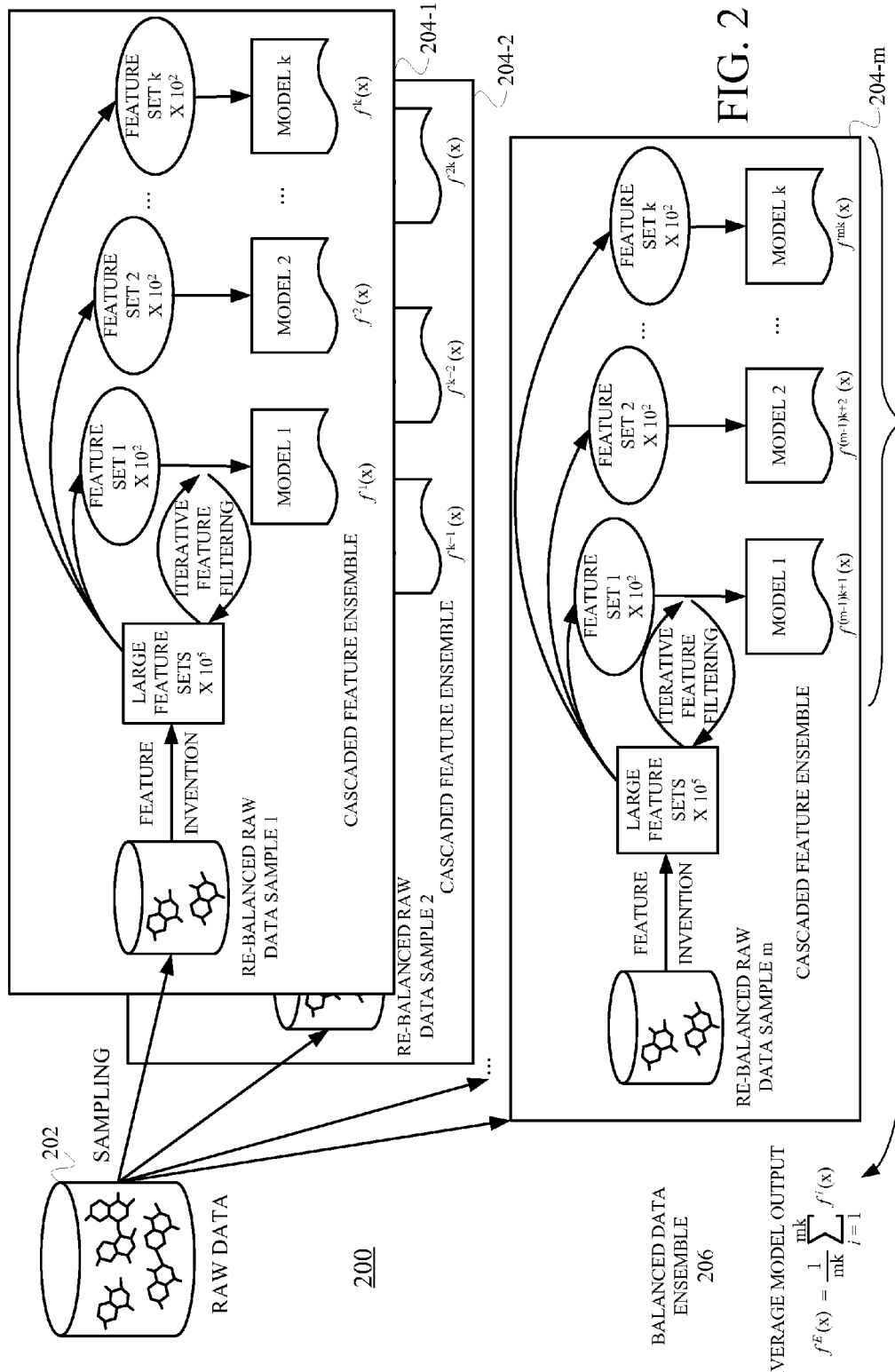
FIG. 2 illustrates major modules of a classification methodology, according to an embodiment of the invention.

FIG. 2 is a diagram illustrating an exemplary system illustration of the methodology for classifying graphs according to an embodiment of the present invention. In particular, FIG. 2 illustrates methodology 200 in accordance with the modules described above in the context of FIG. 1. In this illustrative embodiment, there are three steps:

Step 1. Using Balanced Data Ensemble (206) to draw a set of balanced sample data subsets from the structural dataset (202).

Step 2. For each balanced sample data subset, using Cascaded Feature Ensembles (204-1 through 204-$m$) to build multiple classifiers.

Step 3. All of the classifiers learned in multiple Cascaded Feature Ensembles are collected. For a given structured input data set, the assigned class for this data is the class predicted by the majority of classifiers.

For ease of reference, the remainder of the detailed description will be divided into the following sections: (I) Preliminary Concepts; (II) Frequent Subgraph-based Classification; (III) Cascaded Feature Ensemble; (IV) Balanced Data Ensemble; (V) Empirical Study; and (VI) Illustrative Computer System for Implementing Graph Classification System.

(I) Preliminary Concepts

Graphs are widely used to represent complex structures that are difficult to model. Several different types of graphs exist. One type, called a labeled graph, has vertices and edges that are associated with attributes, typically labeled s. Another type, called an unlabeled graph, has vertices and edges, but no attributes associated with them. Some exemplary attributes include, but are not limited to, tags in Extensible Markup Language (XML) documents, atoms/bonds in chemical compounds, genes in biological networks and object descriptors in images.

The use of labeled graphs or unlabeled graphs depends on the application. The techniques presented herein are applicable to both labeled graphs and unlabeled graphs.

The parameters of a graph may be defined as follows. The vertex set of a graph G may be denoted by V(G) and the two edge set by E(G). A label function l maps a vertex or an edge to a label. The size of a graph is defined by the number of edges it has, written as |G|.

Further, a graph G is a subgraph of graph G' if there exists a subgraph isomorphism from G to G', denoted by G $\subseteq$ G'. In this case G' is called a supergraph of G.

A subgraph isomorphism is an injective function $f$: V(G)$\rightarrow$V(G'), such that (1) $\forall u \in V(G), l(u)=l'(f(u))$ and (2) $\forall (u,u) \in E(G), (f(u),f(v)) \in E(G')$ and $l(u,v)=l'(f(u),f(v))$, wherein l and l' are the label functions of G and G', respectively. $f$ is called an embedding of G in G'.

Given a graph database D, a graph g is a frequent subgraph if sup(g)$\geq$min_sup, where sup(g) is the percentage of graphs in D in which g is a subgraph; min_sup is a user-specified minimum support threshold.

(II) Frequent Subgraph-Based Classification

For a graph training set, feature invention is done by applying frequent subgraph mining with a user-specified minimum support to get a set of frequent subgraphs. A feature selection method is used to select a compact set of discriminative features in the following way: the set of frequent subgraphs F are ranked in the descending order of some discriminative measure, such as information gain. Feature selection method selects features according to the ranked feature list until every training instance is covered by $\delta$ features or when F=$\phi$. When the graph data is transformed into a feature vector representation based on the selected features, a classifier is built on top of it. Any general purpose classification model can be used, such as support vector machine, decision tree, etc.

(III) Cascaded Feature Ensemble

A problem with a frequent subgraph is that it usually produces a large number of features, which is typically around $10^5$ or even $10^6$. On the other hand, the frequent subgraphs may not "cover" the training examples uniformly, causing the partial feature coverage problem—some examples may have significantly fewer invented features representing them than others. To handle the partial feature coverage problem, a cascaded feature ensemble is proposed. More specifically, for a training set, multiple disjoint subsets of frequent subgraphs are progressively selected. Multiple classifiers are constructed based on the same dataset with different features. Each classifier has sufficient discriminative power based on the selected features, although it could still make mistakes on the partially covered instances. However, since the feature sets are disjoint, each classifier tends to make uncorrelated errors which can be eliminated by averaging. The outputs of multiple classifiers are combined by a cascaded feature ensemble.

Given a set of frequent subgraphs F, feature selection is applied to get a subset of features $F_i$, then data is transformed into this feature space and a classifier is built on top of it. Then, the selected feature set $F_i$ is removed from F and the same process is repeated on the remaining set of features, until $k_f$ features sets are selected with $k_f$ corresponding classifiers constructed. Given a test example x, each classifier $C_i$ outputs an estimated posterior probability $f^i(x)$. The final prediction is derived by combining probability outputs from $k_f$ models, by $$f^E(x) = \frac{1}{k_f} \sum_{i=1}^{k_f} f^i(x).$$

(IV) Balanced Data Ensemble

In real applications, the original graph database usually contains a set of training instances, in which the positive class is very rare and the negative class is dominant. In order to balance the class distribution, a sampling technique is employed to draw repeated samples of the positive class and under-samples of the negative class. The balanced training set can significantly improve recall on the rare positive class. For a balanced training set, the graph classification procedure is performed. In order to reduce the variance caused by sampling, multiple training sets are generated by the sampling step with disjoint negative instances. Multiple classifiers are built based on the different re-balanced samples and an ensemble is used to combine the output of different classifiers. To create disjoint negative under-samples, sampling without replacement is used.

Assume there is a positive training set P and a negative set N where $|P|<<|N|$. Sampling is applied on N by $|N_i|=|P|/r$ with a user-specified parameter r, deriving a series of under-samples $N_i, i=1, \ldots, k_d$. For each balanced training set $P \cup N_i$, a classifier $C_i$ is trained. For testing, decisions from $k_d$ classifiers $C_1, \ldots, C_{k_d}$ are combined. More specifically, given a test example x, each classifier $C_i$ outputs an estimated posterior probability $f^i(x)$. The probability outputs from multiple models are combined by $$f^E(x) = \frac{1}{k_d} \sum_{i=1}^{k_d} f^i(x).$$

This is called balanced data ensemble.

(V) Empirical Study

An examination of the graph classification with ensemble techniques will now be described. The performance of the graph classification techniques was compared with two alternative methodologies, both of which are based on a single classification model. One methodology used the whole set of training set without sampling for distribution balance (termed "NS") and the other methodology used balanced training set (termed "SS"). It is shown that the graph classification techniques of the present invention (termed "SE") can substantially improve classification performance with very skewed class distribution.

Two series of real graph datasets were used in this empirical study. One dataset was an AIDS antiviral screen dataset containing the topological structures of chemical compounds. This dataset is available from the National Cancer Institute/U.S. National Institute of Health (NCI/NIH): Developmental Therapeutics Program (see, e.g., http:// dtpsearch.ncifcrf.gov/FTP/AIDO99SD.BIN). The screening tests are evaluated in one of the following three categories: confirmed active (CA), confirmed moderately active (CM) and confirmed inactive (CI). Two classification problems are formulated out of this dataset. The first problem is designed to classify between CM+CA and CI, denoted as H1; the second between CA and CI, denoted as H2. The second dataset series are the NCI anti-cancer screen datasets, selected from the bioassay records for cancer cell lines. These datasets are available from the PubChem Project (see, e.g., http://pubchem.ncbi.nlm.nih.gov). Each dataset forms a classification problem where the class labels are either active or inactive.

FIG. 3 shows the class distribution of the datasets. N denotes the total number of instances, $N_+$ denotes the number of positive examples and $N_-$ denotes the number of negative examples. The last column denotes the percentage of the positives in the whole dataset.

The experiments are evaluated with two measures: AUC (area under "radius of curvature" (ROC) curve) and MSE (mean squared error). AUC is a good measure on datasets with skewed distribution. ROC curve shows the trade-off between the true positive rate and false positive rate. A good classifier would produce a ROC curve as close to the left-top corner as possible. In the ideal case, the area under a ROC curve is one. In addition, MSE (mean squared error) is used to evaluate the posterior probability estimation. It is defined as $$L = \frac{1}{n} \sum_{i=1}^{n} (f^E(x_i) - p(+|x_i))^2.$$

Through experimentation, it is illustrated that the graph classification techniques of the present invention can effectively recognize the rare positive examples and outperform the other alternatives up to 60% (in AUC) in all dataset, as shown in FIG. 4. It is also illustrated that both the sampling and ensemble techniques developed by the present graph classification are both effective. Lastly, it is illustrated that the single classification model approach using either skewed samples ("NS") or balanced samples ("SS") does not perform well.

Experiments were also conducted to test the effectiveness of cascaded feature ensemble, as shown in FIG. 5. The performance of graph classification with (termed "SE+FE") and without cascaded feature ensemble (termed "SE") is examined based on two metrics AUC and MSE. It is illustrated that cascaded feature ensemble can further improve the classification performance.

(VI) Illustrative Computer System for Implementing Graph Classification System

Figure 6:
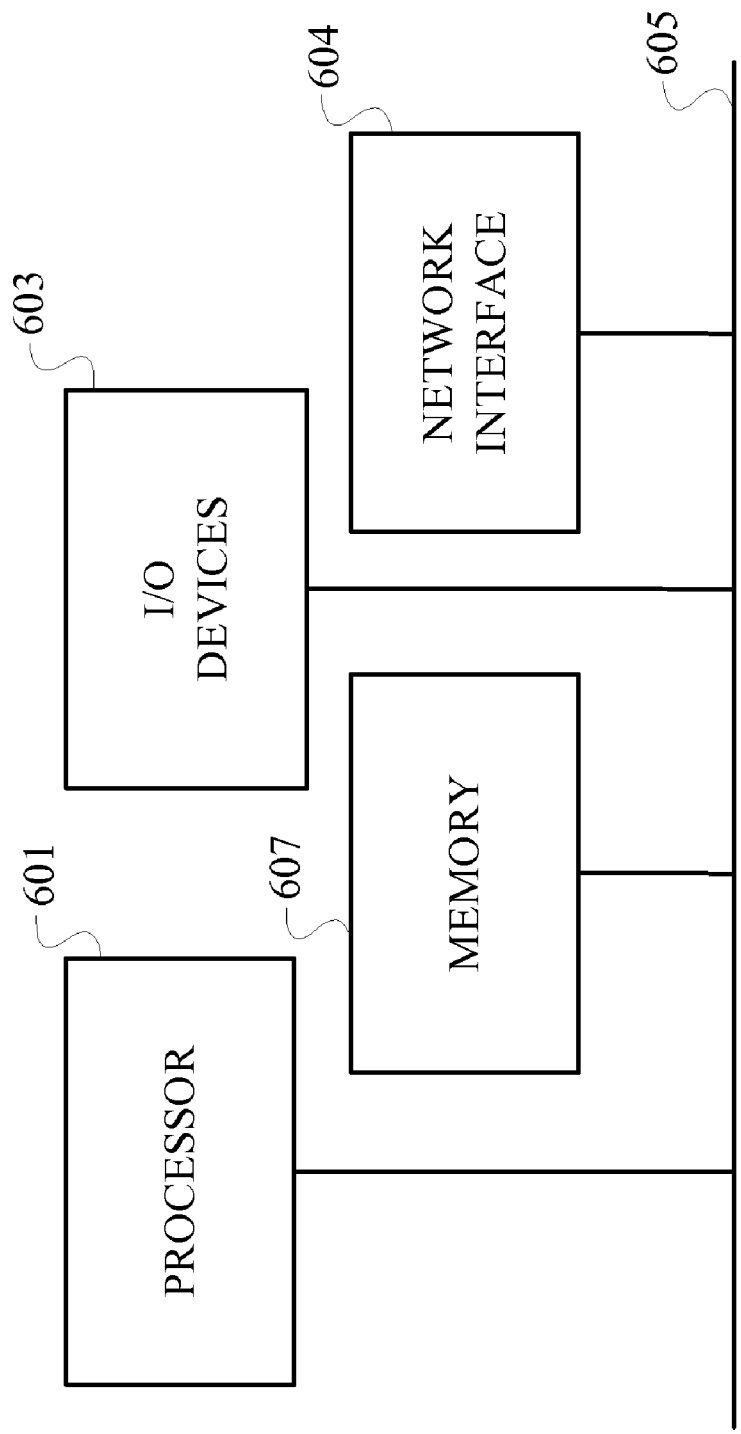
FIG. 6 shows a computer system in accordance with which one or more components/steps of the techniques of the invention may be implemented.

Lastly, FIG. 6 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 6 may represent one or more modules capable of providing all or portions of the functions described herein. That is, the computer system may represent one or more client devices, one or more servers, or one or more other processing devices.

The computer system may generally include a processor 601, memory 602, input/output (I/O) devices 603, and network interface 604, coupled via a computer bus 605 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered an example of a computer readable storage medium such that, when one or more programs for performing the graph classification techniques of the present invention are embodied thereon and executed by a computer, the computer readable storage medium is an article of manufacture.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Advantageously, as illustratively explained in detail herein, principles of the invention provide techniques for graph classification with skewed prior class distribution, which are capable of handling two main issues: skewed class distribution and partial feature coverage. To address the skewed distribution, repeated samples of the positives and under-samples of the negatives are drawn to derive balanced data distribution. Then, frequent subgraph mining and model construction are performed on the balanced samples. In order to reduce the variance introduced by sampling, an ensemble combines multiple probabilistic estimators constructed from different re-balanced samples. As for the partial feature coverage problem inherent in frequent subgraphs, a cascaded feature ensemble approach is proposed, where multiple feature sets are selected to encode the data in disjoint feature subspaces with decreasing or cascaded discriminating information.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for classifying structural input data, the method comprising a computer system performing steps of:
constructing multiple classifiers, wherein each classifier is constructed on a subset of training data, using selected composite features from the subset of training data, the composite features being selected by iteratively applying a feature selection step wherein multiple disjoint feature sets are identified to represent the structural input data in different feature spaces, and the structural input data, when characterized by a skewed prior class distribution, being subjected to a sampling step to obtain a balanced class distribution; and
computing a consensus among the multiple classifiers in accordance with a voting scheme such that at least a portion of the structural input data is assigned to a particular class in accordance with the computed consensus;
wherein the computer system comprises a memory and a processor device operatively coupled to the memory.

2. The method of claim 1, wherein the subset of training data is selected from a full training dataset, among which positive and negative data are balanced.

3. The method of claim 1, wherein the composite features are not the same across different classifiers.

4. The method of claim 1, wherein the composite features are selected so as to differentiate training data.

5. The method of claim 4, wherein the composite features are selected such that feature discrimination and class labels are considered.

6. The method of claim 4, wherein the composite features are substructures directly mined from structural datasets.

7. The method of claim 1, wherein the structural data comprises skewed structural data.

8. The method of claim 7, wherein the skewed structural data comprises skewed graph data.

9. Apparatus for classifying structural input data, the apparatus comprising:
a memory; and
a processor operatively coupled to the memory and configured to: construct multiple classifiers, wherein each classifier is constructed on a subset of training data, using selected composite features from the subset of training data, the composite features being selected by iteratively applying a feature selection step wherein multiple disjoint feature sets are identified to represent the structural input data in different feature spaces, and the structural input data, when characterized by a skewed prior class distribution, being subjected to a sampling step to obtain a balanced class distribution; and compute a consensus among the multiple classifiers in accordance with a voting scheme such that at least a portion of the structural input data is assigned to a particular class in accordance with the computed consensus.

10. The apparatus of claim 9, wherein the subset of training data is selected from a full training dataset, among which positive and negative data are balanced.

11. The apparatus of claim 9, wherein the composite features is not the same across different classifiers.

12. The apparatus of claim 9, wherein the composite features are selected so as to differentiate training data.

13. The apparatus of claim 12, wherein the composite features are selected such that feature discrimination and class labels are considered.

14. The apparatus of claim 12, wherein the composite features are substructures directly mined from structural datasets.

15. The apparatus of claim 9, wherein the structural data comprises skewed structural data.

16. The apparatus of claim 15, wherein the skewed structural data comprises skewed graph data.

17. An article of manufacture for classifying structural input data, the article comprising a computer readable storage medium having one or more programs embodied therewith wherein the one or more programs, when executed by a computer, perform steps of:
constructing multiple classifiers, wherein each classifier is constructed on a subset of training data, using selected composite features from the subset of training data, the composite features being selected by iteratively applying a feature selection step wherein multiple disjoint feature sets are identified to represent the structural input data in different feature spaces, and the structural input data, when characterized by a skewed prior class distribution, being subjected to a sampling step to obtain a balanced class distribution; and computing a consensus among the multiple classifiers in accordance with a voting scheme such that at least a portion of the structural input data is assigned to a particular class in accordance with the computed consensus.

* * * * *